United States Patent
Tsumasaka et al.

(10) Patent No.: US 9,973,135 B2
(45) Date of Patent: May 15, 2018

(54) ROTARY ELECTRIC MACHINE CONTROL SYSTEM AND CONTROL METHOD FOR ROTARY ELECTRIC MACHINE

(71) Applicant: HONDA MOTOR CO., LTD., Tokyo (JP)

(72) Inventors: Akio Tsumasaka, Wako (JP); Keisuke Azusawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/447,127

(22) Filed: Mar. 2, 2017

(65) Prior Publication Data
US 2017/0257054 A1  Sep. 7, 2017

(30) Foreign Application Priority Data
Mar. 2, 2016 (JP) ................. 2016-039632

(51) Int. Cl.
G05D 23/00 (2006.01)
H02P 29/032 (2016.01)
H02K 11/21 (2016.01)
H02K 11/25 (2016.01)
H02K 9/19 (2006.01)

(52) U.S. Cl.
CPC ............. *H02P 29/032* (2016.02); *H02K 9/19* (2013.01); *H02K 11/21* (2016.01); *H02K 11/25* (2016.01)

(58) Field of Classification Search
CPC ....... H02P 29/032; H02K 11/25; H02K 11/21; G05B 5/00; G05D 23/00; G05D 23/02; G05D 23/13; G05D 23/19; G05D 23/22; G05D 23/24; G05D 23/26; G05D 23/27; G05D 23/275; G05D 23/30; G05D 23/32

USPC ........ 318/471, 472, 400.001, 700, 701, 727, 318/779, 66, 68, 473; 73/577, 578, 73/119 R, 116.02, 116.03, 118.1

See application file for complete search history.

(56) References Cited

U.S. PATENT DOCUMENTS 7,181,959 B2 * 2/2007 Matsumoto ............. F02B 39/16
73/114.01

FOREIGN PATENT DOCUMENTS

JP 62-180605 U 11/1987
JP 06-098590 4/1994
(Continued)

OTHER PUBLICATIONS

Japanese Office Action for corresponding JP Application No. 2016-039632, dated Dec. 26, 2017 (w/ English machine translation).

*Primary Examiner* — Antony M Paul
(74) *Attorney, Agent, or Firm* — Mori & Ward, LLP (57) ABSTRACT

A rotary electric machine control system includes a rotary electric machine, a rotation speed sensor, a temperature sensor, and circuitry. The rotary electric machine includes a rotor. The rotation speed sensor is to detect a rotation speed of the rotor. The temperature sensor is to detect a temperature of the rotary electric machine. The circuitry is configured to classify an operation time during which the rotor rotates based on the rotation speed detected by the rotation speed sensor and the temperature detected by the temperature sensor. The circuitry is configured to calculate a fatigue degree of the rotor based on the operation time classified. The circuitry is configured to limit the rotation speed of the rotor or output a signal to a user when the fatigue degree exceeds a threshold value.

13 Claims, 6 Drawing Sheets

(56) References Cited

FOREIGN PATENT DOCUMENTS

| JP | 11-337154 | 12/1999 |
| JP | 2009-503329 | 1/2009 |
| JP | 2012-087720 | 5/2012 |
| JP | 2014-025753 | 2/2014 |

* cited by examiner

| NUMBER OF ROTATIONS OF ROTOR [rpm] | ROTOR CORE TEMPERATURE [°C] | | | | | | | | | | | | |
|---|---|---|---|---|---|---|---|---|---|---|---|---|
| | -40 | -20 | 0 | 20 | 40 | 60 | 80 | 100 | 120 | 140 | 160 | 170 | 180 |
| 20000 | a11 | a12 | – | – | – | – | – | – | – | – | – | – | a1m |
| 18000 | – | – | – | – | – | – | – | – | – | – | – | – | – |
| ...... | ...... | ...... | ...... | ...... | ...... | ...... | OPERATION TIME (TIME FREQUENCY) | | | ...... | ...... | ...... | ...... |
| 4000 | – | – | – | – | – | – | – | – | – | – | – | – | – |
| 2000 | – | – | – | – | – | – | – | – | – | – | – | – | – |
| 0 | an1 | – | – | – | – | – | – | – | – | – | – | – | anm |

FIG. 4B 104 (104')

| NUMBER OF ROTATIONS OF ROTOR [rpm] | ROTOR CORE TEMPERATURE [°C] | | | | | | | | | | | | |
|---|---|---|---|---|---|---|---|---|---|---|---|---|
| | -40 | -20 | 0 | 20 | 40 | 60 | 80 | 100 | 120 | 140 | 160 | 170 | 180 |
| 20000 | b11 | b12 | – | – | – | – | – | – | – | – | – | – | b1m |
| 18000 | – | – | – | – | – | – | – | – | – | – | – | – | – |
| ...... | ...... | ...... | ...... | ...... | ...... | ...... | STRESS AMPLITUDE VALUE | | | ...... | ...... | ...... | ...... |
| 4000 | – | – | – | – | – | – | – | – | – | – | – | – | – |
| 2000 | – | – | – | – | – | – | – | – | – | – | – | – | – |
| 0 | bn1 | – | – | – | – | – | – | – | – | – | – | – | bnm |

ROTARY ELECTRIC MACHINE CONTROL SYSTEM AND CONTROL METHOD FOR ROTARY ELECTRIC MACHINE

CROSS-REFERENCE TO RELATED APPLICATIONS

The present application claims priority under 35 U. S. C. § 119 to Japanese Patent Application No. 2016-039632, filed Mar. 2, 2016. The contents of this application are incorporated herein by reference in their entirety.

BACKGROUND OF THE INVENTION

Field of the Invention

The present invention relates to a rotary electric machine control system and a control method for a rotary electric machine.

Discussion of the Background

Japanese Utility Model Laid Open No. 62-180605 discloses an alarm device which generates an alarm when a speed of a rotary machine such as a steam turbine enters a speed zone (a rotation number zone) in which the rotary machine cannot be operated for a long time and an accumulation device which measures an operation time and the number of times of operation for each of separate operation speed zones.

SUMMARY

According to one aspect of the present invention, a rotary electric machine control system includes: a rotary electric machine which includes a rotor; a rotation speed sensor which detects the number of rotations of the rotor; a temperature sensor which detects a temperature of the rotary electric machine; and a control device which controls a rotation of the rotor of the rotary electric machine, wherein the control device calculates an operation time of the rotary electric machine operated under the detected number of rotations of the rotor and the detected temperature of the rotary electric machine and calculates a fatigue degree of the rotor or a parameter involving with the fatigue degree on the basis of the calculated operation time, and the control device limits the number of rotations of the rotor or warns a user when the calculated fatigue degree of the rotor or the parameter involving with the fatigue degree exceeds a predetermined threshold value.

According to another aspect of the present invention, a rotary electric machine control system includes a rotary electric machine, a rotation speed sensor, a temperature sensor, and circuitry. The rotary electric machine includes a rotor. The rotation speed sensor is to detect a rotation speed of the rotor. The temperature sensor is to detect a temperature of the rotary electric machine. The circuitry is configured to classify an operation time during which the rotor rotates based on the rotation speed detected by the rotation speed sensor and the temperature detected by the temperature sensor. The circuitry is configured to calculate a fatigue degree of the rotor based on the operation time classified. The circuitry is configured to limit the rotation speed of the rotor or output a signal to a user when the fatigue degree exceeds a threshold value.

According to further aspect of the present invention, a control method for a rotary electric machine includes detecting a rotation speed of a rotor of the rotary electric machine. A temperature of the rotary electric machine is detected. An operation time during which the rotor rotates is classified based on the rotation speed detected and the temperature detected. A fatigue degree is calculated based on the operation time classified. The rotation speed of the rotor is limited or A signal is outputted to a user when the fatigue degree exceeds a threshold value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Hereinafter, preferred embodiments of a rotary electric machine control system according to the present invention will be described in detail with reference to the accompanying drawings.

Figure 1:
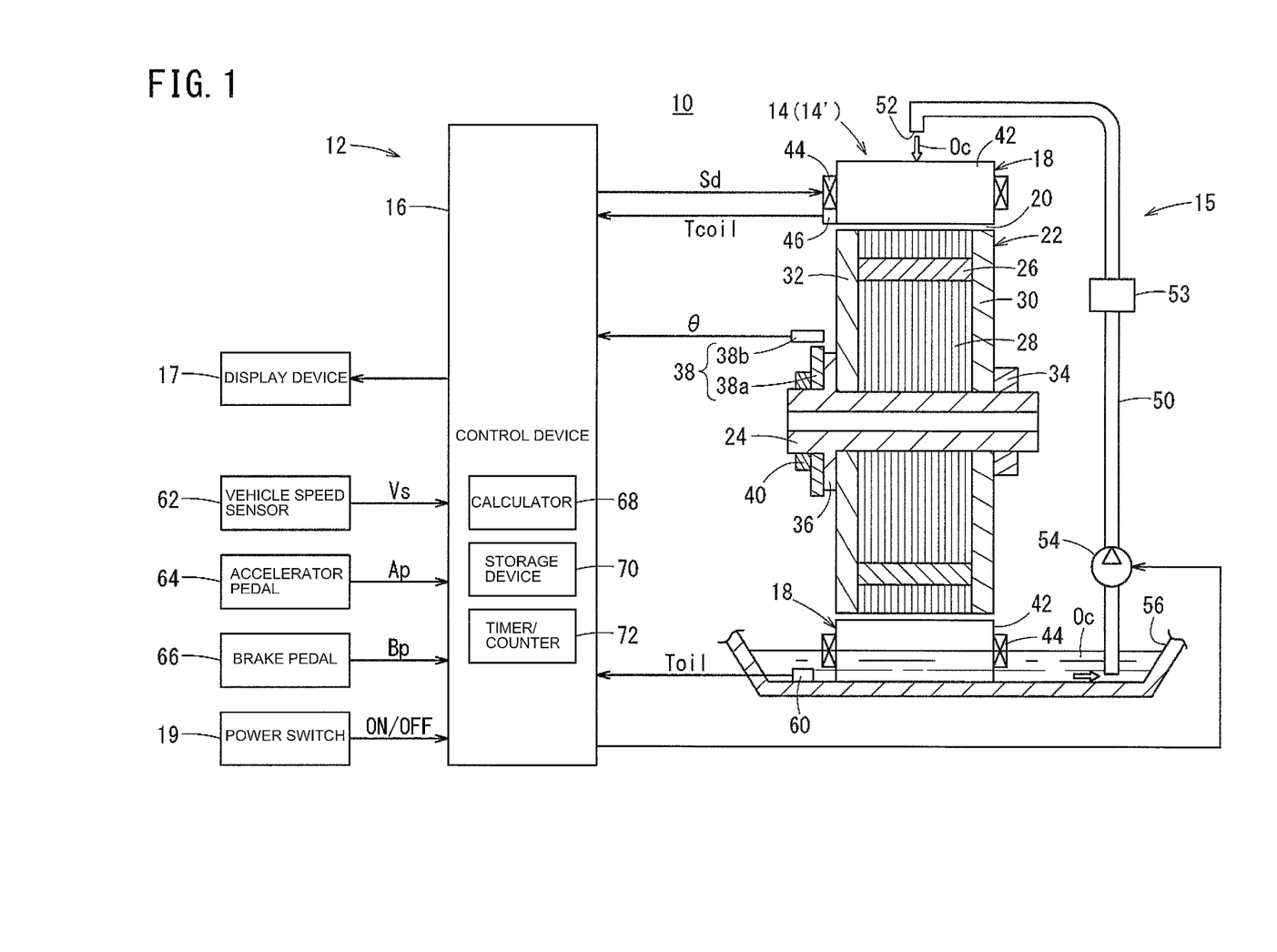
FIG. 1 is a schematic configuration diagram of a vehicle equipped with a rotary electric machine control system according to an embodiment.

FIG. 1 is a schematic configuration diagram of a vehicle 12 equipped with a control system 10 of a rotary electric machine 14 according to the embodiment. In FIG. 1, a part of a cross-sectional configuration of the rotary electric machine 14 which is an embedded magnet synchronous motor is emphasized.

Figure 2:
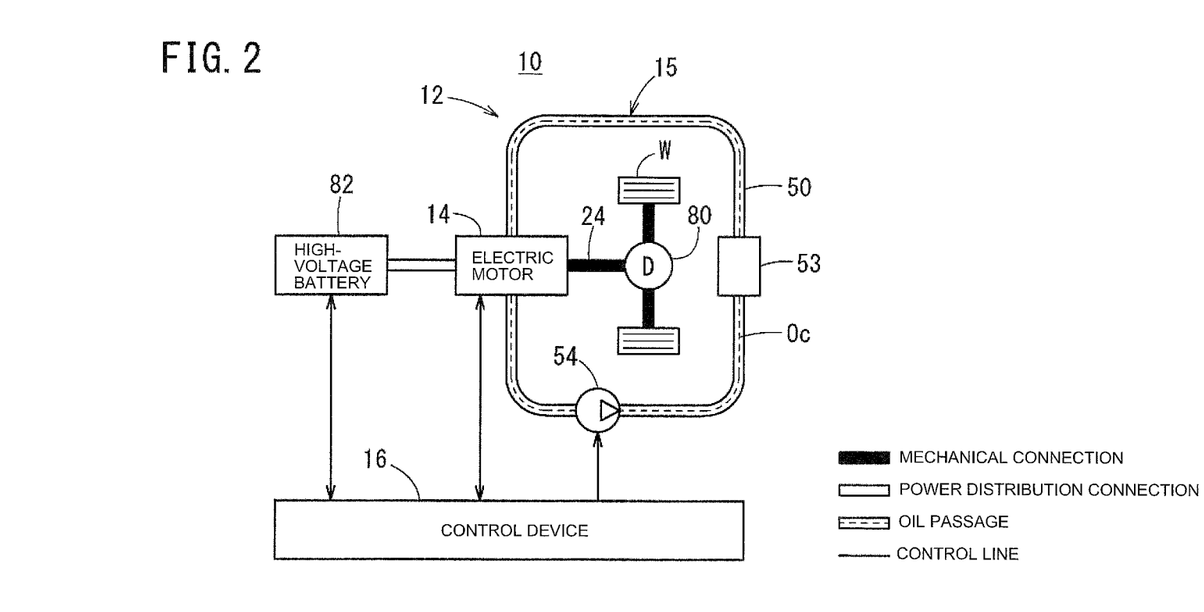
FIG. 2 is an overall schematic block diagram of the vehicle of FIG. 1.

FIG. 2 is an overall schematic block diagram of the vehicle 12 equipped with the control system 10 of the rotary electric machine (the electric motor) 14 according to the embodiment. In FIG. 2, a thick solid line indicates a mechanical connection, a double solid line indicates a power distribution connection, a dashed line within the double solid line indicates an oil passage corresponding to a refrigerant passage, and a thin solid line indicates a control line (including a signal line).

As illustrated in FIG. 2, the vehicle 12 is an electric vehicle, a main shaft 24 of the rotary electric machine (the electric motor) 14 rotates by the power of a high-voltage battery 82, and a drive wheel W is driven through a decelerator 80 so that the vehicle travels.

In FIGS. 1 and 2, the vehicle 12 basically includes the rotary electric machine 14 which is a motor generator driving the drive wheel W, an oil circulation mechanism 15 which circulates oil Oc serving as a liquid refrigerant cooling the rotary electric machine 14 inside the vehicle 12, a display device 17 which is a display/audio device, a power switch 19 which switches an on state (a travelable state) and an off state (a stop state) of the vehicle 12, and a control device 16 which performs an overall control including a control of the rotary electric machine 14 and the oil circulation mechanism 15.

As illustrated in FIG. 1, the rotary electric machine 14 includes a stator 18 which is a fixed piece fixed to a housing (not illustrated) and a rotor 22 which is disposed at the inside of the stator 18 with a gap 20 interposed therebetween.

The rotor 22 includes a main shaft (a rotation shaft) 24 which is supported by the housing to be rotatable, a cylindrical rotor core 28 in which a magnetic steel sheets are laminated and a magnet 26 is embedded and fixed into the laminated magnetic steel sheets, a pair of end plates 30 and 32 which support side faces of the rotor core 28 in the axial direction, a collar 34 which supports one end plate 30, an annular flange portion 36 which is integrally formed with the main shaft 24 and supports the other end plate 32, a resolver rotor 38a which is fitted to the main shaft 24, and a collar 40 which supports the resolver rotor 38a.

In the rotor 22, the other end plate 32, the rotor core 28, one end plate 30, and the collar 34 are sequentially inserted from the right side to the right side face of the flange portion 36 of the main shaft 24 in FIG. 1 and are fixed to the main shaft 24. Further, in the rotor 22, the resolver rotor 38a is fitted from the left side to the left side face of the flange portion 36 of the main shaft 24 in FIG. 1 and is fixed to the main shaft 24 by the collar 40.

A resolver 38 includes the resolver rotor 38a which rotates along with the rotor 22 and a resolver stator 38b which is supported by the housing and is disposed to face the resolver rotor 38a. The resolver stator 38b detects the number N of rotations (the number of rotations of the rotor) of the rotor 22 and a rotation signal θ involving with a rotation position of the magnet 26.

The stator 18 has a configuration in which a coil 44 is wound on teeth 42. A coil temperature sensor 46 which detects a coil temperature Tcoil is disposed at the coil 44. A rotation driving signal Sd of the rotary electric machine 14 (the rotor 22) is supplied from the control device 16 to the coil 44.

The oil circulation mechanism 15 includes an oil passage 50 which includes an oil suction port 51 and an oil ejection port 52, a pump 54 which is provided in the vicinity of the oil suction port 51, and a radiator 53 (see FIG. 2) which cools (exchanges heat with) the oil Oc flowing inside the oil passage 50 by the use of a travel wind or the like.

An oil pan 56 which is formed by a bottom portion of the housing is disposed below the rotary electric machine 14 in the vertical direction. The oil Oc ejected from the oil ejection port 52 is used to lubricate and cool the inside of the rotary electric machine 14 and falls to be stored in the oil pan 56.

When the power switch 19 of the vehicle 12 is turned on, the control device 16 allows the rotor 22 of the rotary electric machine 14 to be in a rotatable state or a rotation state and operates the pump 54. The operated pump 54 suctions the oil Oc stored in the oil pan 56 from the oil suction port 51, circulates the oil Oc through the oil passage 50, and ejects the oil Oc from the oil ejection port 52.

The oil Oc ejected from the oil ejection port 52 cools (exchanges heat with) the stator 18 serving as an armature and heated by the loss of copper and the rotor 22 integrated with the rotor core 28 heated by the loss of iron and falls into the oil pan 56. Further, the oil Oc ejected from the oil ejection port 52 serves as a lubricant of a bearing (not illustrated) of the main shaft 24 and falls into the oil pan 56.

The oil Oc which falls to be stored inside the oil pan 56 is suctioned from the oil suction port 51 by the operation of the pump 54, is cooled (exchanges heat) by the radiator 53 inside the oil passage 50, and reaches the oil ejection port 52 to be circulated. Additionally, the oil ejection port 52 may be provided at a plurality of positions (a temperature increase portion and a necessary lubrication portion) inside the rotary electric machine 14.

An oil temperature sensor 60 which detects the oil temperature Toil corresponding to the temperature of the oil Oc heated (exchanging heat) by the cooling at the inside the rotary electric machine 14 is disposed inside the oil pan 56.

A coil temperature Tcoil, a rotation signal θ, and an oil temperature Toil are respectively supplied from the coil temperature sensor 46, the resolver 38, and the oil temperature sensor 60 to the control device 16.

Further, a vehicle speed Vs, an accelerator opening degree Ap, and a brake stepping amount Bp are respectively supplied from a vehicle speed sensor 62, an accelerator pedal 64, and a brake pedal 66 to the control device 16.

The control device 16 is an ECU (an electronic control device) and includes a calculator 68, a storage device 70, and a timer/counter 72.

The control device 16 serves as various function realizing devices (function realizing units) in which the calculator 68 controls output devices, that is, the rotary electric machine 14, the oil circulation mechanism 15, and the display device 17 by reading and executing a program stored in the storage device 70 on the basis of various input signals. Various function realizing devices constituting the calculator 68 can be also configured by hardware.

Next, a fatigue degree monitoring operation which is performed by the control device 16 for the rotary electric machine 14 of the vehicle 12 equipped with the control system 10 of the rotary electric machine 14 according to the embodiment with the above-described configuration will be described with reference to a flowchart illustrated in FIG. 3.

When the power switch 19 is turned on, the calculator 68 of the control device 16 sets a travelable state or a travel state of the vehicle 12 so that the rotary electric machine 14 is rotatable. In step S1, the rotation signal θ, the oil temperature Toil, and the coil temperature Tcoil are respectively supplied from the resolver 38, the oil temperature sensor 60, and the coil temperature sensor 46 to the calculator 68 of the control device 16.

In step S2, the calculator 68 counts (calculates) the number N [rpm] of rotations (the number of rotations of the rotor) of the rotor 22 on the basis of the rotation signal θ.

Further, in step S3, the calculator 68 estimates the temperature (the rotor core temperature) Tcore of the rotor core 28 by referring to a rotor core temperature estimation characteristic (map) which is created in advance by a simulation or a measurement on the basis of the oil temperature Toil and the coil temperature Tcoil and stored in the storage device 70. Hereinafter, the estimated rotor core temperature Tcore will be also referred to as the rotor core temperature Tcore.

In next step S4, the calculator 68 counts the time frequency of the operation time generated by a combination of the number N of rotations of the rotor and the estimated rotor core temperature Tcore by the use of the timer/counter 72, creates a time frequency (an operation time) map (a time frequency table) 102 to be described later, and stores the time frequency map in the storage device 70.

Figure 4A:
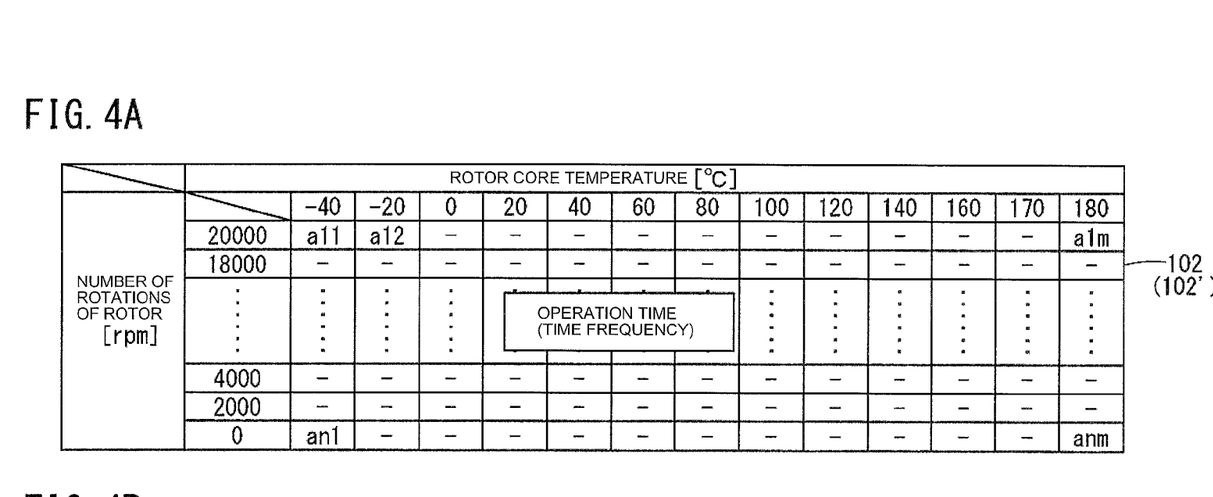
FIG. 4A is an explanatory diagram of a time frequency map and FIG. 4B is an explanatory diagram of a stress amplitude map.

FIG. 4A illustrates an example of the time frequency map 102 which is created and stored in the storage device 70.

The calculator 68 accumulates and records (fills) the operation time (the time frequency) aij (i=1 to n, j=1 to m) of the rotary electric machine 14 by the combination [n, m]=[N, Tcore] at an address (a grid point) of an n-th row and an m-th column specified by the combination of the number N [rpm] of rotations of the rotor (0, 1 to 2000, . . . , 18001 to 20000) and the estimated rotor core temperature Tcore [° C.] on the time frequency map 102. The number N of rotations and the rotor core temperature Tcore may be changed in accordance with the vehicle type.

Next, in step S5, the calculator 68 calculates a fatigue degree (a fatigue strength) Df at a current time point or a parameter Dp involving with the fatigue degree and determines whether the calculated fatigue degree Df or the parameter Dp involving with the fatigue degree exceeds (is larger than) a predetermined threshold value (Df>Dfth, Dp>Dpth=1) (a fatigue strength threshold value determination).

Here, in a case where the fatigue degree Df and the parameter Dp are calculated, a stress amplitude map (a stress amplitude table, a stress amplitude characteristic value table) which is created in advance by a simulation or a measurement and is stored in the storage device 70 is referred.

Figure 4B:
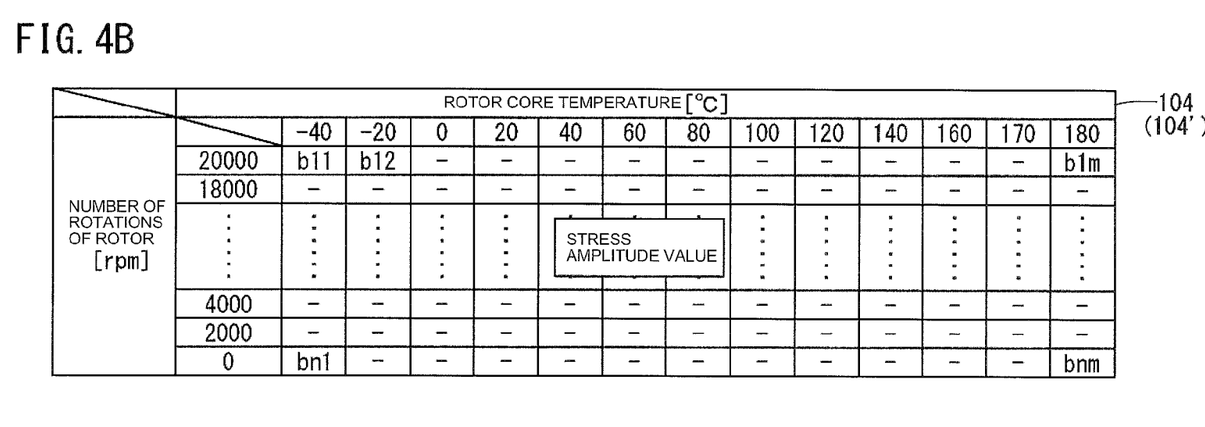

FIG. 4B illustrates a stress amplitude map 104 as an example. The stress amplitude map 104 is configured as a table of a stress amplitude value bij (i=1 to n, j=1 to m) which is an average stress corresponding to a value obtained by adding a centrifugal stress and a cold thermal stress at the combination [n, m]=[N, Tcore] of a certain number N [rpm] of rotations of the rotor and a certain rotor core temperature Tcore [° C.]. The value of the stress amplitude value bij becomes a large value as the number N of rotations of the rotor increases and the rotor core temperature Tcore decreases and becomes a small value as the number N of rotations of the rotor decreases and the rotor core temperature Tcore increases.

The fatigue degree Df is calculated by Equation (1) below and the parameter Dp is set as, for example, a Miner's rule value of the fatigue strength and is calculated by Equation (2) below. An integral value (an accumulation value) is calculated by the corresponding grid point. That is, the fatigue degree Df is a value obtained by multiplying the stress amplitude value bij by the operation time aij at each grid point and accumulating the values and the operation time aij is weighted by the stress amplitude value bij in consideration of the number N of rotations of the rotor and the rotor core temperature Tcore instead of the simple operation time at each of the number N of rotations of the rotor.

$$Df = a11 \times b11 + a12 \times b12 + \ldots amn \times bmn \quad (1)$$

$$Dp = a11/b11 + a12/b12 + \ldots amn/bmn \quad (2)$$

In this case, the determination of the fatigue degree Df in step S5 is made by the determination on whether the fatigue degree Df calculated by Equation (1) is larger than a predetermined threshold value Dfth (Df>Dfth) or not (Df≤Dfth). The determination of the parameter Dp in step S5 is made by the determination on whether the parameter Dp calculated by Equation (2) is larger than a threshold value of "1" (Dp>Dpth=1) or not (Dp≤Dpth=1).

When a determination that the fatigue degree or the parameter is equal to or smaller than the threshold value {(Df≤Dfth) or (Dp≤Dpth=1)} is made, it is determined that the fatigue strength of the rotor 22 (the rotor core 28) sufficiently remains. As illustrated in step 6, the calculator 68 returns a routine to step S1 without limiting the number N of rotations of the rotor and the rotation acceleration N/Δt (Δt indicates a unit time) of the rotor 22 of the rotary electric machine 14 and limiting the vehicle speed Vs (including the acceleration).

Here, the non-limiting state indicates, for example, a state where the number N of rotations per unit time of the rotary electric machine 14 increases to be proportional to an opening degree Ap of the accelerator pedal 64, that is, an increase in rotation acceleration N/Δt is not limited. Alternatively, the non-limiting state indicates a state where the rotary electric machine is controlled so that the number N of rotations is allowed to the rated number of rotations.

Meanwhile, when a determination that the fatigue degree or the parameter is larger than the threshold value {(Df>Dfth) or (Dp>Dpth=1} is made, it is determined that the fatigue strength approaches a limit. Then, in step S7, the calculator 68 performs a control of limiting the vehicle speed Vs (including the acceleration). Specifically, the maximal value of the number N of rotations of the rotor and the maximal value of the rotation acceleration N/Δt of the rotor 22 of the rotary electric machine 14 are limited. Then, in step S8, the calculator 68 displays an alarm of asking the user to replace the rotary electric machine 14 on the display device 17.

As described above, the vehicle 12 equipped with the control system 10 of the rotary electric machine 14 according to the embodiment includes the rotary electric machine 14 which is an electric motor herein, the resolver 38 which measures a rotation signal θ indicating a rotation angle of the electric motor, the coil temperature sensor 46 which measures the coil temperature Tcoil of the coil 44, and the oil temperature sensor 60 which measures the oil temperature Toil of the oil Oc used to cool the rotor core 28.

The rotary electric machine control system 10 calculates the number N of rotations from the rotation signal θ, estimates the rotor core temperature Tcore of the rotor core 28 from the coil temperature Tcoil and the oil temperature Toil, and estimates or calculates the fatigue degree Df of the rotor core 28 and the parameter Dp involving with the fatigue degree Df from the operation time (the time frequency, the rotation frequency) and the estimated rotor core temperature Tcore. Then, when the fatigue degree Df exceeds the threshold value Dfth corresponding to a certain frequency or the parameter Dp exceeds a threshold value of "1", the control device limits the vehicle speed Vs and notifies the replacement of the rotary electric machine 14 to the user.

For this reason, it is possible to suppress an increase in cost of the rotary electric machine 14 including the rotor 22 while reliably preventing a damage of the rotor 22 in advance. That is, since the use of the user out of the fatigue strength guarantee range is limited and the operation out of the fatigue strength guarantee range is limited, an enough material below may be selected in consideration of a travel mode in which the strength of the rotor 22 is guaranteed.

Other Embodiments

Figure 5:
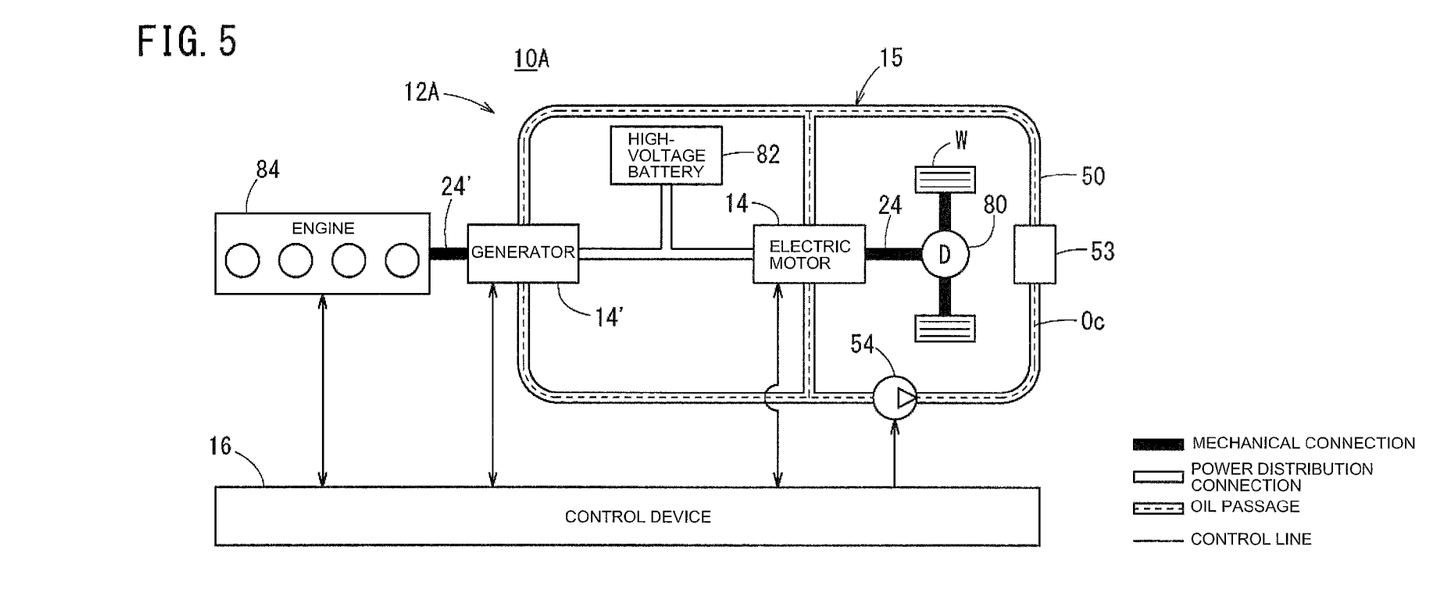
FIG. 5 is an overall block diagram of a vehicle equipped with a rotary electric machine control system according to the other embodiment.

FIG. 5 is an overall block diagram of a vehicle 12A equipped with a control system 10A of a rotary electric machine 14' according to the other embodiment. The vehicle 12A is a series hybrid vehicle.

In order to help the comprehension of the vehicle 12A of FIG. 5, the same reference numerals will be given to the same or corresponding components as or to the components of the vehicle 12 illustrated in FIGS. 1 and 2 and a detailed description thereof will be omitted.

The vehicle 12A basically includes an electric motor 14 which is a rotary electric machine corresponding to a motor generator driving the drive wheel W through the main shaft 24 and the decelerator 80, a generator 14' which is a rotary electric machine supplying power to the electric motor 14 or the high-voltage battery 82 (a cross-sectional structure which is partially omitted is the same as that of the rotary electric machine 14 illustrated in FIG. 1 although the rating is different), an engine 84 which rotates the main shaft 24 of the generator 14', an oil circulation mechanism 15 which lubricates and cools the electric motor 14 and the generator 14', and the control device 16 which controls these components.

Even in FIG. 5, a thick solid line indicates a mechanical connection, a double solid line indicates a power distribution connection, a dashed line within the double solid line indicates an oil passage corresponding to a refrigerant passage, and a thin solid line indicates a control line (including a signal line).

The vehicle 12A is equipped with the engine 84 for charging the high-voltage battery 82 and the generator 14'. In a travelable state and a travel state where the power switch 19 is turned on, the main shaft 24 of the electric motor 14 is rotated by the power of the high-voltage battery 82 and/or the generator 14' while power is generated by the generator 14' through the normal rotation of the main shaft 24' of the engine 84 and then the drive wheel W is rotated through the decelerator 80 so that the vehicle travels.

When the main shafts 24' and 24 of the generator 14' and the electric motor 14 rotate, the generators 14' and the electric motor 14 generate heat. For this reason, the vehicle 12A is configured to cool the generator 14' other than the electric motor 14 by the oil Oc flowing in the oil circulation mechanism 15.

Figure 3:
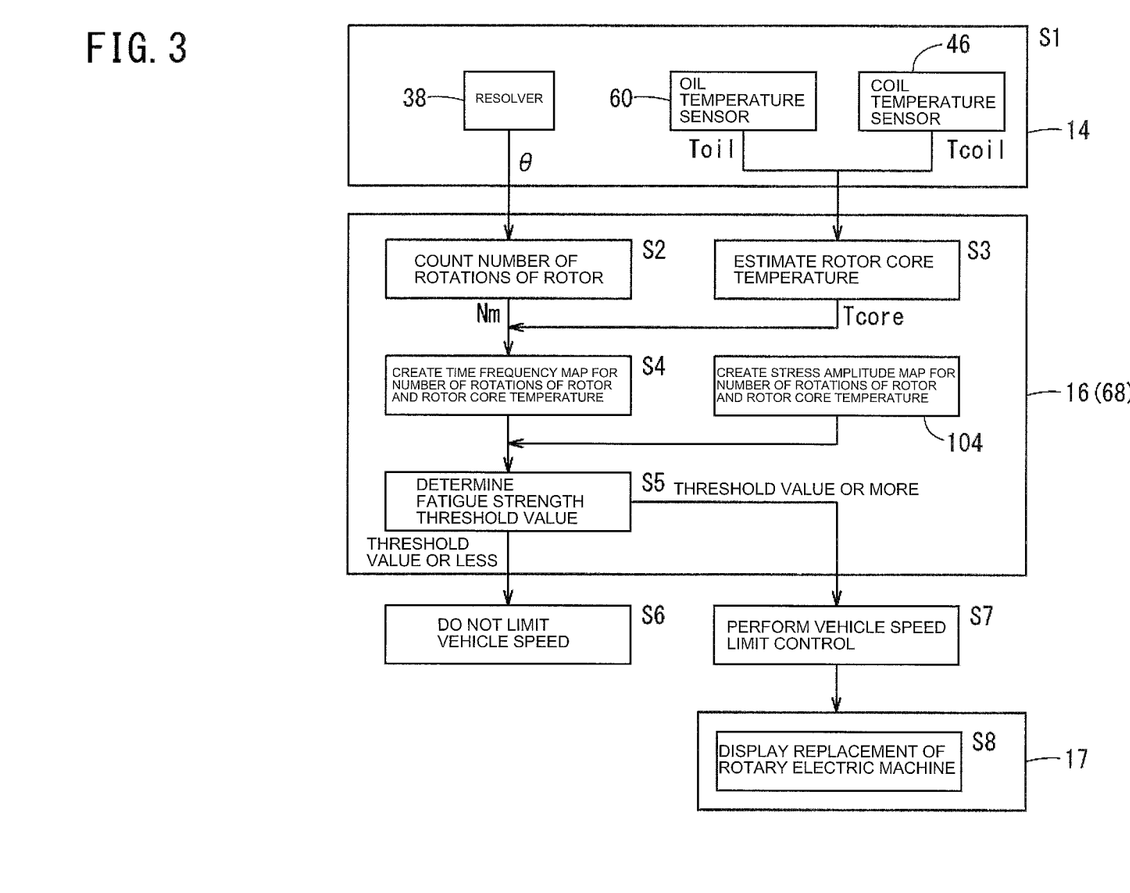
FIG. 3 is a flowchart illustrating an operation of the embodiment.

As described above, the fatigue degree of the electric motor 14 is monitored by a flowchart illustrated in FIG. 3.

Similarly, there is a need to monitor the fatigue degree of the generator 14'.

Figure 6:
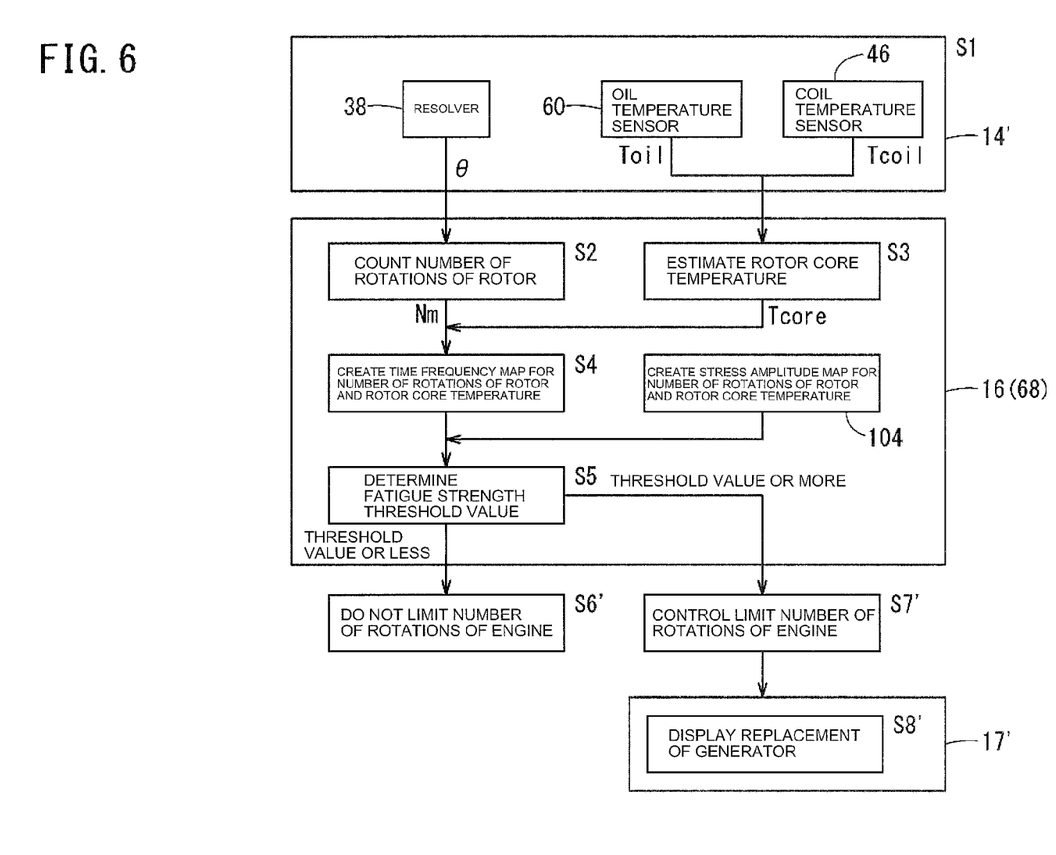
FIG. 6 is a flowchart illustrating an operation of the other embodiment.

Next, a monitoring operation of the control device 16 for the generator 14' of the vehicle 12A equipped with the control system 10A of the generator 14' which is a rotary electric machine according to the other embodiment will be described with reference to a flowchart illustrated in FIG. 6 and corresponding to the flowchart illustrated in FIG. 3.

Additionally, since the process step of the electric motor 14 and the process step of the generator 14' are similar to each other except for steps S6', S7', and S8', the process can be easily understood. "'" will be added to the same step number in order to easily describe the process.

When the power switch 19 is turned on, a rotatable state or a rotation state of the generator 14' is set by the calculator 68 of the control device 16. In step S1, the rotation signal θ, the oil temperature Toil, and the coil temperature Tcoil are transmitted from the resolver 38, the oil temperature sensor 60, and the coil temperature sensor 46 to the calculator 68.

In step S2, the calculator 68 counts (calculates) the number N [rpm] of rotations of the rotor 22 on the basis of the rotation signal θ.

In step S3, the calculator 68 estimates the rotor core temperature Tcore on the basis of the oil temperature Toil and the coil temperature Tcoil.

In step S4, the calculator 68 counts the time frequency generated by a combination of the number N of rotations of the rotor and the estimated rotor core temperature Tcore by the use of the timer/counter 72, creates a time frequency (an operation time) map (a time frequency table) 102' (FIG. 4A) in the storage device 70, and accumulates and records (fills) the operation time (the time frequency) aij of the generator 14'.

In step S5, the calculator 68 calculates the fatigue degree (the fatigue strength) Df at a current time point illustrated in Equation (1) or the parameter Dp involving with the fatigue degree and illustrated in Equation (2) and determines whether the calculated fatigue degree Df or the parameter Dp involving with the fatigue degree exceeds (is larger than) a predetermined threshold value (Df>Dfth, Dp>Dpth=1).

Here, in a case where the fatigue degree Df and the parameter Dp are calculated, a stress amplitude map (a stress amplitude table, a stress amplitude characteristic value table) 104' (FIG. 4B) which is created in advance by a simulation or a measurement and is stored on the storage device 70 is referred.

In this case, the determination of the fatigue degree Df in step S5 is made by the determination on whether the fatigue degree Df calculated by Equation (1) is larger than the predetermined threshold value Dfth (Df>Dfth) or not (Df≤Dfth). The determination of the parameter Dp in step S5 is made by the determination on whether the parameter Dp calculated by Equation (2) is larger than the threshold value Dpth of "1" (Dp>Dpth=1) or not (Dp≤Dpth=1).

When a determination that the fatigue degree or the parameter is equal to or smaller than the threshold value {(Df≤Dfth) or (Dp≤Dpth=1)} is made, the number of rotations of the engine is not limited as illustrated in step S6'. Meanwhile, when a determination that the fatigue degree or the parameter is larger than the threshold value {(Df>Dfth) or (Dp>Dpth=1)} is made, the number of rotations of the engine is limited in step S7'. Then, in step S8', the calculator 68 displays an alarm of asking the user to replace the generator 14' on the display device 17.

As described above, the vehicle 12A equipped with the control system 10A of the generator 14' serving as the rotary electric machine according to the other embodiment calculates the number N of rotations from the rotation signal θ, estimates the rotor core temperature Tcore of the rotor core 28 from the coil temperature Tcoil and the oil temperature Toil, and estimates the fatigue degree Df of the rotor core 28 from the rotation frequency and the estimated rotor core temperature Tcore. Then, when the fatigue degree Df or the parameter Dp involving with the fatigue degree Df exceeds the threshold value Dfth corresponding to a certain frequency or the threshold value Dpth of "1", the control device limits the number of rotations of the engine and displays an alarm of asking the user to replace the generator 14' on the display device 17.

For this reason, it is possible to suppress an increase in cost of the generator 14' including the rotor 22 while reliably preventing a damage of the rotor 22 of the generator 14' in advance.

Summary of Embodiment and Other Embodiment

As described above, according to the embodiment and the other embodiment described above, it is possible to highly accurately estimate the fatigue degree Df of the rotor 22 (the rotor core 28) when the rotary electric machine (the electric motor 14 or the generator 4') including the rotor 22 is operated at various temperature environments and is driven at various operation loads.

As a result, it is possible to suppress an increase in cost of the rotary electric machine (the electric motor 14 or the generator 14') including the rotor 22 while reliably preventing a damage of the rotor 22 in advance.

Additionally, the fatigue degree Df and the parameter Dp involving with the fatigue degree Df are accumulation values obtained by weighting the operation time (the time frequency) through the stress amplitude value bij. When the accumulation value exceeds the threshold value Dfth and Dpth of "1", the control limits the number N of rotations of the rotor 22 or warns the user. For this reason, even when the stress value determining the fatigue degree Df of the rotor 22 is different in accordance with the number N of rotations of the rotor 22 or the estimated rotor core temperature Tcore of the rotary electric machine (the electric motor 14 or the generator 14'), it is possible to highly accurately calculate the fatigue degree Df of the rotor 22 by a relatively simple and easy calculation.

Additionally, the present invention is not limited to the above-described embodiment and various configurations can be employed on the basis of the content of the specification. For example, the vehicle 12A illustrated in FIG. 5 can be modified into an intelligent hybrid vehicle which drives the drive wheel W by the engine 84 and/or the electric motor 14. Then, in the intelligent hybrid vehicle, when the number N [rpm] of rotations of the rotor of the electric motor 14 is calculated, a conversion may be used by applying an inversion number of a deceleration ratio of the decelerator 80 to the vehicle speed Vs obtained from the vehicle speed sensor 62 such as a vehicle wheel speed sensor provided in the drive wheel W or the like without the resolver 38. Additionally, even in the vehicles 12 and 12A illustrated in FIGS. 1 and 5, the number N of rotations of the rotor may be calculated by using the vehicle speed Vs when the resolver 38 is broken.

According to a rotary electric machine control system of the present invention, the rotary electric machine control system is configured to include: a rotary electric machine which includes a rotor; a rotation speed sensor which detects the number of rotations of the rotor; a temperature sensor which detects a temperature of the rotary electric machine; and a control device which controls a rotation of the rotor of the rotary electric machine, wherein the control device calculates an operation time of the rotary electric machine operated under the detected number of rotations of the rotor and the detected temperature of the rotary electric machine and calculates a fatigue degree of the rotor or a parameter involving with the fatigue degree on the basis of the calculated operation time, and the control device limits the number of rotations of the rotor or warns a user when the calculated fatigue degree of the rotor or the parameter involving with the fatigue degree exceeds a predetermined threshold value.

According to the present invention, since the control device limits the number of rotations of the rotor or warns the user when the fatigue degree of the rotor or the parameter involving with the fatigue degree calculated on the basis of the operation time of the rotor at the temperature of the rotary electric machine and the number of rotations of the rotor exceeds a predetermined threshold value, it is possible to highly accurately estimate the fatigue degree of the rotor when the rotary electric machine including the rotor is operated at various temperature environments and is driven at various operation loads.

As a result, it is possible to suppress an increase in cost of the rotary electric machine including the rotor while preventing a damage of the rotor in advance.

In this case, the control device preferably limits the number of rotations of the rotor or warns the user when an accumulation value accumulated for the operation time exceeds a threshold value in response to the number of rotations of the rotor and the temperature of the rotary electric machine. In the present invention, the operation time is weighted on the basis of the number of rotations of the rotor and the temperature of the rotary electric machine. Then, when the weighted accumulation value exceeds a threshold value, the control device limits the number of rotations of the rotor or warns the user. For this reason, even when the stress value determining the fatigue degree of the rotor is different in accordance with the number of rotations of the rotor or the temperature of the rotary electric machine, it is possible to highly accurately calculate the fatigue degree of the rotor by a relatively simple and easy calculation.

EFFECT OF THE INVENTION

According to the present invention, since the control device limits the number of rotations of the rotor or warns the user when the fatigue degree of the rotor or the parameter involving with the fatigue degree calculated on the basis of the operation time at the number of rotations of the rotor of the rotary electric machine and the temperature of the rotary electric machine exceeds a predetermined threshold value, it is possible to highly accurately estimate the fatigue degree of the rotor when the rotary electric machine including the rotor is operated at various temperature environments and is driven at various operation loads.

As a result, it is possible to suppress an increase in cost of the rotary electric machine including the rotor while preventing a damage of the rotor in advance.

Obviously, numerous modifications and variations of the present invention are possible in light of the above teachings. It is therefore to be understood that within the scope of the appended claims, the invention may be practiced otherwise than as specifically described herein.

What is claimed is:

1. A rotary electric machine control system comprising:
a rotary electric machine which includes a rotor;
a rotation speed sensor which detects the number of rotations of the rotor;
a temperature sensor which detects a temperature of the rotary electric machine; and
a control device which controls a rotation of said rotor of said rotary electric machine,
wherein said control device calculates an operation time of said rotary electric machine based on the detected number of rotations of said rotor and the detected temperature of said rotary electric machine and calculates a fatigue degree of said rotor or a parameter involved with said fatigue degree on the basis of said calculated operation time, and
said control device limits the number of rotations of said rotor or warns a user when said calculated fatigue degree of the rotor or the parameter involved with said fatigue degree exceeds a predetermined threshold value.

2. The rotary electric machine control system according to claim 1,
wherein said control device limits the number of rotations of the rotor or warns the user when an accumulation value accumulated for said operation time exceeds a threshold value in response to the number of rotations of said rotor and said temperature of said rotary electric machine.

3. The rotary electric machine control system according to claim 1, wherein said rotary electric machine is an electric motor or a generator.

4. The rotary electric machine control system according to claim 1,
wherein said control device limits the number of rotations of said rotor by limiting a vehicle speed.

5. The rotary electric machine control system according to claim 1,
wherein the number of rotations of said rotor detected by said rotation speed sensor is calculated based on a rotation signal supplied from a resolver.

6. A rotary electric machine control system comprising:
a rotary electric machine comprising a rotor;
a rotation speed sensor to detect a rotation speed of the rotor;
a temperature sensor to detect a temperature of the rotary electric machine; and
circuitry configured to
classify an operation time during which the rotor rotates based on the rotation speed detected by the rotation speed sensor and the temperature detected by the temperature sensor,
calculate a fatigue degree of the rotor based on the operation time classified, and
limit the rotation speed of the rotor or output a signal to a user when the fatigue degree exceeds a threshold value.

7. The rotary electric machine control system according to claim 6,
wherein the circuitry is configured to limit the rotation speed of the rotor or output the signal to the user when an accumulation value exceeds a threshold value, the accumulation value being a value obtained by accumulating the operation time weighted in accordance with the rotation speed of the rotor and the temperature of the rotary electric machine.

8. The rotary electric machine control system according to claim 6,
wherein the rotary electric machine is an electric motor or a generator.

9. The rotary electric machine control system according to claim 6,
wherein the circuitry is configured to limit the number of rotations of the rotor by limiting a vehicle speed.

10. A control method for a rotary electric machine, comprising:
detecting a rotation speed of a rotor of the rotary electric machine;
detecting a temperature of the rotary electric machine;
classifying an operation time during which the rotor rotates based on the rotation speed detected and the temperature detected;
calculating a fatigue degree based on the operation time classified; and
limiting the rotation speed of the rotor or outputting a signal to a user when the fatigue degree exceeds a threshold value.

11. The control method for a rotary electric machine according to claim 10,
wherein the rotary electric machine is an electric motor or a generator.

12. The control method for a rotary electric machine according to claim 10,
wherein the limiting the rotation speed of the rotor is performed by limiting a vehicle speed.

13. The control method for a rotary electric machine according to claim 10,
wherein the limiting the rotation speed of the rotor is performed when an accumulation value exceeds a threshold value, the accumulation value being a value obtained by accumulating the operation time weighted in accordance with the rotation speed of the rotor and the temperature of the rotary electric machine.

* * * * *